(12) United States Patent
Tanaka et al.

(10) Patent No.: US 6,770,383 B2
(45) Date of Patent: Aug. 3, 2004

(54) PLATED MATERIAL, METHOD OF PRODUCING SAME, AND ELECTRICAL/ELECTRONIC PART USING SAME

(75) Inventors: Hitoshi Tanaka, Tokyo (JP); Akira Matsuda, Tokyo (JP); Satoshi Suzuki, Tokyo (JP); Morimasa Tanimoto, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/247,319

(22) Filed: Sep. 18, 2002

(65) Prior Publication Data

US 2003/0091855 A1 May 15, 2003

Related U.S. Application Data

(63) Continuation of application No. PCT/JP02/00279, filed on Jan. 17, 2002.

(30) Foreign Application Priority Data

Jan. 19, 2001 (JP) ........................................ 2001-011854
Sep. 28, 2001 (JP) ........................................ 2001-303734

(51) Int. Cl.[7] ............................ H01R 13/03; C25D 3/00
(52) U.S. Cl. ........................ 428/646; 428/647; 428/648; 428/929; 439/886; 427/123; 427/376.8
(58) Field of Search ............................... 428/646, 647, 428/648, 674, 675, 676, 929; 439/886; 427/376.8, 383.7, 405, 123

(56) References Cited

U.S. PATENT DOCUMENTS

| | | | | |
|---|---|---|---|---|
| 5,028,492 A | * | 7/1991 | Guenin | 428/614 |
| 5,780,172 A | * | 7/1998 | Fister et al. | 428/647 |
| 5,916,695 A | * | 6/1999 | Fister et al. | 428/647 |
| 6,083,633 A | * | 7/2000 | Fister et al. | 428/615 |
| 6,183,885 B1 | * | 2/2001 | Nakamura et al. | 428/647 |
| 6,312,762 B1 | * | 11/2001 | Sugawara et al. | 427/376.2 |
| 6,336,979 B1 | * | 1/2002 | Sugawara et al. | 148/536 |
| 6,451,449 B2 | * | 9/2002 | Asakura et al. | 428/615 |

FOREIGN PATENT DOCUMENTS

| | | |
|---|---|---|
| JP | 59-5582 | 12/1984 |
| JP | 04-329891 | 11/1992 |
| JP | 08-007940 | 1/1996 |
| JP | 10-302864 | 11/1998 |
| JP | 11-121075 | 4/1999 |
| JP | 11-135226 | * 5/1999 |

* cited by examiner

Primary Examiner—John J. Zimmerman
(74) Attorney, Agent, or Firm—Knobbe Martens Olson & Bear LLP

(57) ABSTRACT

To provide a plated material having both high heat-resistance and good insertability/extractability. The plated material comprises an undercoating of any one of metals belonging to group 4, group 5, group 6, group 7, group 8, group 9 or group 10 of the periodic table or an alloy containing any one of those metals as a main component, an intermediate coating of Cu or a Cu alloy, and a top-coating of Sn or an Sn alloy, the undercoating, the intermediate coating and the top-coating being formed on a surface of an electrically conductive base in this order, and the thickness of the top-coating is 1.9 times or more the thickness of the intermediate coating.

8 Claims, 1 Drawing Sheet

PLATED MATERIAL, METHOD OF PRODUCING SAME, AND ELECTRICAL/ ELECTRONIC PART USING SAME

RELATED APPLICATIONS

This application is a continuation application under 35 U.S.C. §§365 and 120 of International Application PCT/JP02/000279, filed Jan. 17, 2002, which claims priority to Japanese Patent Applications No. 2001-11854 and 2001-303734, filed Jan. 19, 2001 and Sep. 28, 2001, respectively. The International Application was published under PCT Article 21(2) in a language other than English.

DESCRIPTION

1. Technical Field

The present invention relates to a plated material, a method of producing the plated material, and an electrical/electronic part using the plated material. More specifically, the present invention relates to a plated material that has high heat-resistance and is suited to be a material for a connector used in a high temperature environment such as an engine room of an automobile. Further, the present invention relates to a plated material that has both high heat-resistance and good insertability/extractability, so that it is suited to be a material for a fitting-type connector or contactor used in a high temperature environment.

2. Prior Art

A plated material comprising an electrically conductive base of Cu or Cu alloy and a coating of Sn or Sn alloy formed on the base is known as a high-performance electrical conductor having high electrical conductivity and high strength of the base as well as good electric-contact property, high corrosion-resistance and good solderability of Sn or Sn alloy. The plated material of this type is used widely for various terminals, connectors, etc.

As the plated material of this type, usually a material that is produced by forming an undercoating of Cu or Ni on a base and then forming a coating of Sn or Sn alloy directly on the undercoating is used. The undercoating is provided to restrain a component of the base (component of alloy such as Cu or Zn) from diffusing into the top-coating of Sn or Sn alloy. Especially when the undercoating is a coating of Ni or Ni alloy, it is highly effective in retarding the above-mentioned diffusion into the top-coating of Sn or Sn alloy even in a high temperature environment. As a result, the properties of Sn or Sn alloy of the top-coating are maintained for a long time.

However, even the above-described plated material having an undercoating of Ni or Ni alloy has a problem. That is, when the plated material is used at a place where the temperature becomes very high, for example, near an engine in an engine room of an automobile, Cu of the base and Ni or Ni alloy of the undercoating still diffuse toward the top-coating with time. After a certain time has passed, the top-coating is no longer the original coating of Sn or Sn alloy, that is, the top-coating of Sn or Sn alloy practically disappears. As a result, the plated material does not exhibit its original performance.

The problem like this can be solved by making the thickness of the top-coating of Sn or Sn alloy larger so that it may take longer for the top-coating to disappear. However, the solution like this leads to waste of resources. In addition, it may cause another problem. That is, in the case where the plated material is used for, for example, a connector where many terminals are fitted at the same time (a fitting-type connector), the above solution may make it difficult to fit the terminals to a partner member.

In the fitting-type connector, a male terminal is fitted in a female terminal to thereby form electrical connection. In recent years, regarding a connector terminal used in an automobile, transmitted information has been increasing and electronic control performance has been developing. With this, multiplication of connector pins has been proceeding. In that case, if force required for inserting a terminal stays the same, a connector having a larger number of pins needs as much larger force for insertion. Thus, regarding a connector having a large number of connector pins, reduction in the force required for insertion is demanded.

As a terminal that meets this demand, there is, for example, a terminal having a top-coating of Au. When this terminal is used, the force required for insertion reduces. However, Au is expensive, which causes another problem that the cost of producing the terminal is high.

As a connector terminal, a terminal comprising an electrically conductive base of, for example, Cu and an Sn coating formed on the surface of the base is generally used. In the case of this terminal, since Sn is a material that is easily oxidized, a hard skin layer of Sn oxide is always formed on the surface of the terminal when the terminal is in the atmosphere.

When this terminal is inserted, the hard skin layer of Sn oxide breaks at the time the terminal fits in a partner member. As a result, the non-oxidized Sn coating under the hard skin layer of Sn oxide comes in contact with the partner member, so that electrical connection is formed between both. However, if the formed Sn coating is thin, the oxide layer does not easily break when the terminal fits in the partner member. In addition, in the case where the base is of Cu or Cu alloy, Sn of the thin Sn top-coating reacts with a component of the base in practical use in a high temperature environment, so that Cu is exposed at the surface and a layer of Cu oxide is formed on the surface. As a result, reliability of contact with the partner member is lost.

The probability that the problem as above happens can be reduced by making the Sn top-coating thicker. However, this causes another problem that larger force for insertion is required when the terminal is fitted to the partner member.

Thus, there is a problem that particularly in a high temperature environment, there is no choice but to use an expensive Au-plated terminal or an Sn-plated terminal having a thick Sn top-coating and a small number of pins.

When a coating of Sn or Sn alloy is formed on the surface of a terminal, bright Sn plating or reflow Sn plating is applied generally.

In the case of a coating formed by bright Sn plating, the coating contains a large amount of additives used in plating. In addition, the grain size of Sn crystal in the coating is fine. Therefore, the surface of the coating has good lubricity, and the amount of the coating scraped off at the time of fitting or sliding is small. Thus, the coating has good insertability/extractability. However, because of the fine grain size, when the material with this coating is used in a high temperature environment, the rate of grain-boundary diffusion of a component of the base is high, so that the component of the base may diffuse up to the surface of the terminal. Thus, the material with the coating formed by bright Sn plating has low heat-resistance.

In reflow Sn plating, after plating of the entire surface is finished, the top-coating is heated and fused. As a result, in the top-coating formed by reflow Sn plating, Sn has a large grain size, and the additives that had come into the coating during plating have been removed. Therefore, even in a high temperature environment, the rate of grain-boundary diffusion of a component of the base is low. Thus, the material with the coating formed by reflow Sn plating has high heat-resistance. However, because of the large grain size, the amount of the coating scraped off at the time of fitting or sliding is large. In addition, since the amount of additives contained in the coating is small, the coating is worse in lubricity, and therefore worse in insertability/extractability.

In this situation, various methods have been proposed for improving heat-resistance and insertability/extractability of the Sn coating.

For example, Japanese Unexamined Patent Publication No. Hei 8-7940 and Japanese Unexamined Patent Publication No. Hei 4-329891 disclose methods in which a coating of a metal having a high melting point, especially of Ni is formed as an undercoating for an Sn coating so as to improve heat-resistance. In the case of these methods, in the temperature range of about 100~120° C., the Ni coating restrains reaction between a component of the base (component of an alloy such as Cu, Zn or the like) and Sn of the Sn coating. In addition, the rate of reaction between Ni and Sn is low. Therefore, the heat-resistance effect is obtained. However, in a high temperature environment of 140° C. or higher, the rate of reaction between Ni and Sn becomes higher, and the quality of the Sn top-coating changes. As a result, the heat-resistance effect is not obtained.

Japanese Unexamined Patent Publication No. Hei 11-121075 and Japanese Unexamined Patent Publication No. Hei 10-302864 disclose methods in which the thickness of an Sn top-coating is made small so as to improve insertability/extractability.

In the case of the Sn top-coating formed by these methods, the amount of the top-coating scraped off at the time of fitting or sliding is smaller, and insertability/extractability is better. However, since the thickness of the Sn coating is small, only with a little heating, the Sn top-coating turns into an alloy by a component of the base diffusing in it, and therefore disappears. This leads to increase in contact-resistance between a terminal and its partner member.

As stated above, with the conventional plated materials having an Sn top-coating, there is a problem that it is very difficult to ensure both heat-resistance and insertability/extractability.

DISCLOSURE OF THE INVENTION

An object of the present invention is to provide a plated material having a top-coating of Sn or Sn alloy which is designed to ensure that even in a high temperature environment, the rate of diffusion reaction between the top-coating and a base or an undercoating is low so that the plated material may have high heat-resistance, and also provide a plated material which has both high heat-resistance and good insertability/extractability and is suited to be a material for a fitting-type connector or contactor used in a high temperature environment.

Another object of the present invention is to provide a method of producing the above-mentioned plated material, and to provide an electrical/electric part, for example, a fitting-type connector or contactor using the above-mentioned plated material.

In order to attain the above objects, the present invention provides a plated material comprising an undercoating of any one of metals belonging to group 4, group 5, group 6, group 7, group 8, group 9 or group 10 of the periodic table or an alloy containing any one of those metals as a main component, an intermediate coating of Cu or a Cu alloy, and a top-coating of Sn or an Sn alloy, the undercoating, the intermediate coating and the top-coating being formed on a surface of an electrically conductive base in this order.

In this case, there are provided a plated material in which it is desirable that the thickness of the undercoating is 0.05~2 μm and the thickness of the intermediate coating is 0.01~1 μm, and a plated material in which it is desirable that the thickness of the top-coating is 1.9 times or more the thickness of the intermediate coating.

Further, the present invention provides a method of producing a plated material, wherein on a surface of an electrically conductive base, an undercoating of any one of metals belonging to group 4, group 5, group 6, group 7, group 8, group 9 or group 10 of the periodic table or an alloy containing any one of those metals as a main component, an intermediate coating of Cu or a Cu alloy, and a top-coating of Sn or an Sn alloy are formed in this order.

In this case, it is desirable that after the intermediate coating is formed, an Sn coating and a coating made of at least one metal chosen from a group consisting of Ag, Bi, Cu, In, Pb and Sb are formed on the intermediate coating in this order, and then reflow treatment or thermal diffusion treatment is performed.

Further, the present invention provides electrical/electronic parts, more specifically, a fitting-type connector, a contactor, etc. using the above plated material.

BEST MODE OF CARRYING OUT THE INVENTION

A plated material according to the present invention has a four-layer structure described later. The material for and thickness of each layer is designed as described later, in order to improve heat-resistance or improve both heat-resistance and insertability/extractability.

Figure 1:
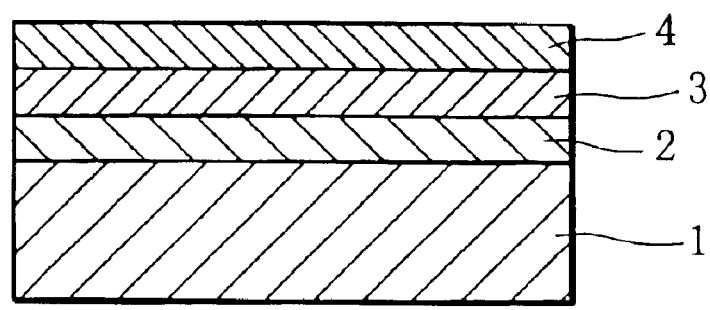
FIG. 1 is a cross-sectional view of an example of a plated material according to the present invention.

First, as shown in FIG. 1, the plated material according to the present invention as a whole has an undercoating 2, an intermediate coating 3, and a top-coating 4 (each described later) which are formed on an electrically conductive base 1 in this order. The most important feature of this plated material is that the intermediate coating 3 exists between the undercoating 2 and the top-coating 4 and performs a function described later, so that disappearance of the top-coating 4 in a high temperature environment is restrained.

The material for the electrically conductive base 1 is not restricted to any special one. For example, in view of being used for a connector, the material for the electrically conductive base 1 may be chosen from among, for example, pure copper; copper alloys such as phosphor bronze, brass, nickel silver, beryllium copper, Corson alloy; pure iron; iron alloys such as stainless steel; various nickel alloys; and composite materials such as Cu-coated Fe material and Ni-coated Fe material, depending on the required mechanical strength, heat-resistance and electrical conductivity, appropriately.

Among the above materials, Cu or Cu alloy is preferable.

In the case where the electrically conductive base 1 is not made of a Cu material, if the surface of the electrically conductive base 1 is plated with Cu or Cu alloy prior to practical use, the adhesiveness and corrosion resistance of a coating formed thereon is further improved.

The undercoating 2 formed on the electrically conductive base 1 is provided in order to ensure the adhesion strength between the base 1 and the top-coating. In addition, the undercoating 2 functions as a barrier layer that prevents thermal diffusion of a component of the base towards the top-coating. Specifically, the undercoating 2 is made of any of periodic table group 4 elements (Ti, Zr, Hf), group 5 elements (V, Nb, Ta), group 6 elements (Cr, Mo, W), group 7 elements (Mn, Tc, Re), group 8 elements (Fe, Ru, Os), group 9 elements (Co, Rh, Ir) and group 10 elements (Ni, Pd, Pt), or an alloy containing any of these elements as a main component.

All the above-mentioned metals are high-melting metals having a melting point of 1000° C. or higher. On the other hand, for example, the temperature of use environment for a connector is generally 200° C. or lower. Therefore, in such use environment, the possibility of thermal diffusion of a component in the undercoating 2 is low. Moreover, the undercoating 2 prevents thermal diffusion of a component of the base toward the top-coating, effectively.

Among the above-mentioned metals, Ni, Co and Fe are preferable because of the cost and ease of plating. As alloys containing any of these metals as a main component, for example, Ni-P, Ni-Sn, Co-P, Ni-Co, Ni-Co-P, Ni-Cu, Ni-Cr, Ni-Zn, Ni-Fe, etc. can be mentioned.

Though the above-described undercoating can be formed by a plating method such as PVD method, it is preferable to apply a wet plating method.

Here, if the main purpose is to improve the heat-resistance of the plated material, it is desirable that the thickness of the undercoating 2 is in the range of 0.05~2 μm.

This is because if the thickness of the undercoating 2 is too small, the undercoating 2 does not produce the above-mentioned effects sufficiently, and if the thickness of the undercoating 2 is too large, large strain is accumulated in the coating, so that the coating separates from the base 1 easily.

If both improvement in heat-resistance and improvement in insertability/extractability of the plated material are intended, it is useful to make the thickness of the top-coating 4 small. In that case, however, the undercoating 2 needs to produce a greater diffusion-prevention effect. For this purpose, it is desirable that the thickness of the undercoating 2 is 0.25 μm or larger, though it is not restricted to any particular thickness. However, too large a thickness of the undercoating 2 is useless. Moreover, it may be cause cracking when the plated material is machined into a terminal. In view of formability, it is desirable that the upper limit of the thickness of the undercoating 2 is in the range of about 0.5~2 μm.

Next, the intermediate coating 3 formed on the undercoating 2 is made of Cu or Cu alloy. The intermediate coating 3 functions as a layer that prevents inter-diffusion between a component of the undercoating 2 and Sn of the top-coating 4 in a manner described later.

Figure 2:
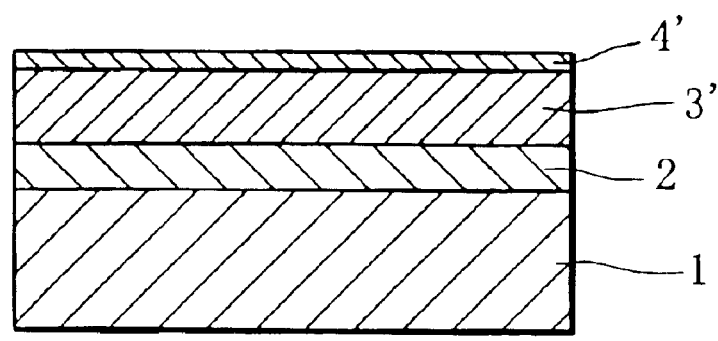
FIG. 2 is a cross-sectional view showing a layer structure which the plated material of FIG. 1 takes when it is placed in a high temperature environment.

The rate of reaction between Cu of the intermediate coating 3 and a component of the undercoating 2 (the above-mentioned metal or alloy) is higher than the rate of reaction between Cu of the intermediate coating 3 and Sn of the top-coating 4. Therefore, when the plated material is placed in a high temperature environment, thermal diffusion of Sn of the top-coating 4 into the intermediate coating 3 goes on, so that the intermediate coating 3 turns into a layer 3' of Sn-Cu intermetallic compound as shown in FIG. 2. At the same time, Sn of the top-coating 4 of the plated material moves and diffuses into the intermediate coating 3, starting from the boundary between the top-coating 4 and the intermediate coating 3, and turns into the above-mentioned intermetallic compound. As a result, the coating 4' of remaining Sn (or Sn alloy) has a smaller thickness. When Cu of the intermediate coating 3 finishes receiving Sn or Sn alloy that diffuses from the top-coating, the inter-diffusion between Sn or Sn alloy and Cu or Cu alloy stops.

As a result, as shown in FIG. 2, part of the intermediate coating 3 and part of the top-coating 4 shown in FIG. 1 turn into a layer 3' of an intermetallic compound. The top-coating 4 in FIG. 1 remains as a layer 4' of Sn or Sn alloy, though its thickness is smaller than before.

The existence of the layer 3' of an intermetallic compound between the undercoating 2 and the layer 4' of Sn or Sn alloy restrains reaction between the layer 4' and the undercoating 2.

Thus, in a high temperature environment, the plated material is used with the layer structure shown in FIG. 2, that is, in a state that inter-diffusion between Sn or Sn alloy and Cu or Cu alloy is restrained. Therefore, the top-coating of Sn or Sn alloy does not disappear while the plated material is used.

As Sn-Cu intermetallic compound, $Cu_6Sn_5$ and $Cu_3Sn$ are well known. $Cn_6Sn_5$ is a compound produced by 1.9 volume Sn reacting with 1 volume Cu. $Cn_3Sn_5$ is a compound produced by 0.8 volume Sn reacting with 1 volume Cu.

Therefore, if the thickness of the top-coating 4 is 1.9 times or more the thickness of the intermediate coating 3, the top-coating 4' of Sn or Sn alloy still remains even if Cu of the intermediate coating 3 all turns into the above-mentioned Sn-Cu intermetallic compound due to the above-mentioned interdiffusion. Since the Cu of the intermediate coating 3 is fixed as Sn-Cu intermetallic compound, the thermal diffusion of Cu is restrained.

Considering the above, in the plated material according to the present invention, it is desirable to arrange that the thickness of the top-coating 4 is 1.9 times or more the thickness of the intermediate coating 3.

By doing so, it is ensured that the top-coating 4' of the plated material remains Sn or Sn alloy even in a high temperature environment, which ensures the contact reliability of the plated material.

Here, if the thickness of the intermediate coating 3 is too small, a problem is caused. For example, when the intermediate coating 3 is made of Cu, many fine holes exist in the intermediate coating 3, so that Ni, Cu or another component of the undercoating 2 diffuses through the fine holes in the intermediate coating 3.

If the thickness of the intermediate coating 3 is too large, all the Sn or Sn alloy of the top-coating 4 is consumed in the above-mentioned inter-diffusion unless the thickness of the top-coating 4 is considerably large. As a result, no Sn or Sn alloy remains at the surface of the plated material. If, in order to avoid this, the top-coating 4 is made thick, it leads to a problem that a fitting-type connector using this plated material receives large insertion resistance.

Taking the above problems into consideration, it is desirable that the thickness of the intermediate coating 3 is in the range of 0.01~1.0 μm.

As the Cu alloy which the intermediate coating 3 is to be made of, for example, Cu-Zn, Cu-Sn, Cu-Ni and Ni-Sn can be mentioned. Here, the Cu content needs to be such that does not hinder the formation of the above-mentioned Cu-Sn intermetallic compound. It may be, for example, 50 mass % or higher.

It is to be noted that in the case of the plated material according to the present invention, it is possible to make the thickness of the top-coating 4 small, keeping the above-mentioned relation in thickness between the intermediate coating 3 and the top-coating 4, that is, keeping the condition that the thickness of the latter is 1.9 times or more the thickness of the former. This makes it possible to improve the insertability/extractability.

For example, if the thickness of the intermediate coating 3 is 0.49 $\mu$m or smaller, the plated material has sufficient heat-resistance and at the same time good insertability/extractability even if the thickness of the top-coating is 1 $\mu$m or lower. Further, if the thickness of the intermediate coating 3 is 0.3 $\mu$m or smaller, the thickness of the top-coating 4 can be made further smaller, such as about 0.6 $\mu$m, which is advantageous.

As already mentioned, the top-coating 4 is made of Sn or Sn alloy and provided to ensure that the plated material has desirable electrical contact property, corrosion resistance and solderability. If the top-coating 4 is made of Sn alloy, it is particularly desirable, because insertability/extractability is further improved.

Here, as the Sn alloy, for example, Sn alloys containing one or more metals chosen from Ag, Bi, Cu, In, Pb and Sb are desirable, because such Sn alloys have good solderability and do not let wiskers grow when formed into the top-coating.

It is to be noted that in view of the problem of Pb outflow to an environment, it is better to avoid the use of Sn alloys containing Pb, if possible.

Though the Sn alloy coating can be formed using the known alloy plating bath, it is preferable to form it in the following way, because the production cost can be much reduced.

After the undercoating and the intermediate coating are formed on the base, an Sn coating and a metal coating of one or more metals chosen from Ag, Bi, Cu, In, Pb and Sb are formed in this order. Here, in place of the Sn coating, an Sn alloy coating may be formed.

Next, reflow treatment or thermal diffusion treatment is performed on the entire coatings formed as above to cause selective thermal diffusion between a metal of the metal coating and Sn of the Sn coating (or Sn alloy coating) to turn them into an alloy. For example, in the case of reflow treatment, the treatment should be performed at an actual temperature of 230~300° C. for 5 seconds or less. In the case of thermal diffusion treatment, the treatment should be performed at a temperature of 100~120° C. for several hours. At such degrees of temperature, thermal diffusion hardly occurs between the other coatings.

It is to be noted that in the plated material according to the present invention, a coating of another material having a smaller thickness than those of the above-mentioned coatings may be formed between the base and the undercoating, between the undercoating and the intermediate coating, or between the intermediate coating and the top-coating. Further, the plated material may be in any shape such as the shape of a strip, a circular wire, a rectangular wire or the like.

Embodiments

Embodiments 1~24 of plated material according to the present invention, comparison examples 1~9

On a strip of brass that had received electrolytic degreasing and pickling, an undercoating, an intermediate coating and a top-coating were formed successively. In this way, various plated materials shown in Tables 2 and 3 were produced.

Conditions of plating performed for forming each coating are shown in Table 1.

TABLE 1

| Kind of coating | Composition of plating bath | | Bath temperature (° C.) | Current density (A/dm$^2$) |
|---|---|---|---|---|
| | Kind | Concentration (g/L) | | |
| Ni coating | Nickel sulfamate | 500 | 60 | 5 |
| | Boric acid | 30 | | |
| Co coating | Cobalt sulfate | 500 | 60 | 5 |
| | Boric acid | 30 | | |
| Fe coating | Ferrous sulfate | 250 | 30 | 5 |
| | Ferrous chloride | 30 | | |
| | Ammonium chloride | 30 | | |
| Cu coating | Copper sulfate | 180 | 40 | 5 |
| | Sulfuric acid | 80 | | |
| Cu-Zn coating | Copper potassium cyanide | 50 | 25 | 1 |
| | Zinc potassium cyanide | 30 | | |
| | Potassium cyanide | 10 | | |
| Bright Cu Coating | Cupracid bath by Atotech Japan Co., Ltd. | — | 25 | 5 |
| Bright Sn Coating | FH50 bath by ISHIHARA CHEMICAL CO., LTD. | — | 30 | 5 |
| Sn Coating | 524M bath by ISHIHARA CHEMICAL CO., LTD. | — | 30 | 5 |
| Bright Sn-Bi coating | 05M bath by ISHIHARA CHEMICAL CO., LTD. | — | 30 | 5 |
| Bright Sn-Cu coating | HTC bath by ISHIHARA CHEMICAL CO., LTD. | — | 30 | 5 |
| Bright Sn-Pb coating | FH30 bath by ISHIHARA CHEMICAL CO., LTD. | — | 30 | 5 |

TABLE 1-continued

| Kind of coating | Composition of plating bath | | Bath temperature (° C.) | Current density (A/dm²) |
|---|---|---|---|---|
| | Kind | Concentration (g/L) | | |
| Ag coating | Silver Potassium cyanide | 5 | 20 | 2 |
| | Potassium cyanide | 60 | | |
| Bi coating | Bismuth methanesulfonate | 50 | 20 | 5 |
| | Methanesulfonic acid | 150 | | |
| In coating | Indium sulfate | 50 | 20 | 1 |
| | Sodium sulfate | 40 | | |
| | Sodium tartrate | 200 | | |

Each produced plated material was heated to each temperature shown in FIGS. 2 and 3, and the thickness of the top-coating remaining at that time was measured in a manner specified below. Further, the apparent coefficient of dynamic friction of each plated material in an initial state was measured in a manner specified below.

The thickness of the remaining top-coating: After the plated material was set in an air bath of 100~160° C. for 120 hours, the thickness of the remaining top-coating was measured by galvanostatic current dissolving method.

The apparent coefficient of dynamic friction: The apparent coefficient of dynamic friction was measured by Bauden friction test instrument on the conditions that the load was 294 mN, the sliding length was 10 mm, the sliding speed was 100 M/min, and the number of sliding actions was one. Here, a member used as a partner member was prepared as follows: A brass strip of 0.25 mm in board thickness was plated with Sn by reflow Sn plating so that the Sn coating might be of 1 μm in thickness, and then the strip was bulged to 0.5 mmR.

The results are shown together in FIGS. 2 and 3.

TABLE 2

| | Coatings | | | | | | Top-coating thickness/Intermediate Coating thickness | Thickness of remaining top-coating (μm) | | | | | Apparent coefficient of dynamic friction |
|---|---|---|---|---|---|---|---|---|---|---|---|---|---|
| | Undercoating | | Intermediate coating | | Top-coating | | | Heat treatment temperature (° C.) | | | | | |
| | Kind | Thickness (μm) | Kind | Thickness (μm) | Kind | Thickness (μm) | | Initial | 100 | 120 | 140 | 160 | |
| Embodiment 1 | Ni coating | 0.5 | Cu coating | 0.1 | Bright Sn coating | 0.3 | 3 | 0.20 | 0.10 | 0.00 | 0.00 | 0.00 | 0.12 |
| Embodiment 2 | Ni coating | 0.5 | Cu coating | 0.1 | Bright Sn coating | 0.6 | 6 | 0.50 | 0.37 | 0.20 | 0.05 | 0.00 | 0.15 |
| Embodiment 3 | Ni coating | 0.5 | Cu coating | 0.2 | Bright Sn coating | 0.6 | 3 | 0.05 | 0.23 | 0.21 | 0.18 | 0.12 | 0.16 |
| Embodiment 4 | Ni coating | 0.5 | Cu coating | 0.2 | Bright Sn coating | 1 | 5 | 0.90 | 0.62 | 0.60 | 0.59 | 0.43 | 0.21 |
| Embodiment 5 | Ni coating | 0.5 | Cu coating | 0.3 | Bright Sn coating | 1 | 3.3 | 0.90 | 0.42 | 0.40 | 0.38 | 0.34 | 0.19 |
| Embodiment 6 | Ni coating | 0.5 | Bright Cu coating | 0.3 | Bright Sn coating | 1 | 3.3 | 0.90 | 0.40 | 0.39 | 0.37 | 0.33 | 0.20 |
| Embodiment 8 | Co coating | 0.5 | Cu coating | 0.3 | Bright Sn coating | 1 | 3.3 | 0.90 | 0.42 | 0.41 | 0.39 | 0.34 | 0.20 |
| Embodiment 10 | Fe coating | 0.5 | Cu coating | 0.3 | Bright Sn coating | 1 | 3.3 | 0.90 | 0.42 | 0.41 | 0.39 | 0.35 | 0.20 |
| Embodiment 11 | Ni coating | 0.5 | Cu—Zn coating | 0.3 | Bright Sn coating | 1 | 3.3 | 0.88 | 0.39 | 0.37 | 0.36 | 0.30 | 0.20 |
| Embodiment 12 | Ni coating | 0.5 | Cu coating | 0.2 | Sn coating → Reflow treatment | 0.6 | 3 | 0.50 | 0.22 | 0.21 | 0.21 | 0.20 | 0.25 |
| Embodiment 13 | Ni coating | 0.5 | Cu coating | 0.04 | Bright Sn coating | 1 | 25 | 0.90 | 0.55 | 0.46 | 0.22 | 0.00 | 0.21 |
| Embodiment 14 | Ni coating | 0.5 | Cu coating | 0.3 | Bright Sn coating | 0.6 | 2 | 0.50 | 0.12 | 0.10 | 0.02 | 0.00 | 0.16 |
| Embodiment 15 | Ni coating | 0.5 | Cu coating | 0.3 | Bright Sn coating | 1.5 | 5 | 1.40 | 0.91 | 0.89 | 0.87 | 0.86 | 0.26 |
| Embodiment 16 | Ni coating | 0.5 | Cu coating | 0.5 | Bright Sn coating | 1 | 2 | 0.90 | 0.31 | 0.10 | 0.09 | 0.08 | 0.19 |
| Embodiment 17 | Ni coating | 0.5 | Cu coating | 0.5 | Bright Sn coating | 2 | 4 | 1.90 | 1.34 | 1.14 | 1.10 | 1.05 | 0.29 |

TABLE 3

| | Coatings | | | | | | Top-coating thickness/ Intermediate coating thickness | Thickness of remaining top-coating (μm) Heat treatment temperature (° C.) | | | | | Apparent coefficient of dynamic friction |
|---|---|---|---|---|---|---|---|---|---|---|---|---|---|
| | Undercoating | | Intermediate coating | | Top-coating | | | | | | | | |
| | Kind | Thickness (μm) | Kind | Thickness (μm) | Kind | Thickness (μm) | | Initial | 100 | 120 | 140 | 160 | |
| Embodiment 18 | Ni coating | 0.5 | Cu coating | 0.2 | Sn coating + Ag coating → Reflow treatment | 1 | 5 | 0.75 | 0.62 | 0.42 | 0.21 | 0.13 | 0.14 |
| Embodiment 19 | Ni coating | 0.5 | Cu coating | 0.2 | Bright Sn—Bi coating | 1 | 5 | 0.89 | 0.42 | 0.24 | 0.00 | 0.00 | 0.13 |
| Embodiment 20 | Ni coating | 0.5 | Cu coating | 0.2 | Bright Sn—Bi coating | 1.5 | 7.5 | 1.39 | 0.89 | 0.60 | 0.00 | 0.00 | 0.16 |
| Embodiment 21 | Ni coating | 0.5 | Cu coating | 0.2 | Sn coating + Ag coating → Reflow treatment | 1.5 | 7.5 | 1.25 | 0.72 | 0.50 | 0.00 | 0.00 | 0.17 |
| Embodiment 22 | Ni coating | 0.5 | Cu coating | 0.2 | Bright Sn—Cu coating | 1 | 5 | 0.90 | 0.61 | 0.60 | 0.58 | 0.40 | 0.18 |
| Embodiment 23 | Ni coating | 0.5 | Cu coating | 0.2 | Sn coating + In coating → Reflow treatment | 1 | 5 | 0.75 | 0.44 | 0.43 | 0.00 | 0.00 | 0.22 |
| Embodiment 24 | Ni coating | 0.5 | Cu coating | 0.2 | Bright Sn—Pb coating | 1 | 5 | 0.90 | 0.55 | 0.53 | 0.50 | 0.21 | 0.19 |
| Comparison 1 | Ni coating | 0.5 | Cu coating | 0.5 | Bright Sn coating | 0.6 | 0.2 | 0.50 | 0.00 | 0.00 | 0.00 | 0.00 | 0.16 |
| Comparison 2 | Ni coating | 0.5 | — | — | Bright Sn coating | 1 | — | 0.93 | 0.58 | 0.37 | 0.03 | 0.00 | 0.19 |
| Comparison 3 | Ni coating | 0.5 | — | — | Bright Sn coating | 0.3 | — | 0.24 | 0.00 | 0.00 | 0.00 | 0.00 | 0.14 |
| Comparison 4 | — | — | Cu coating | 0.5 | Bright Sn coating | 0.3 | 0.6 | 0.20 | 0.00 | 0.00 | 0.00 | 0.00 | 0.13 |
| Comparison 5 | — | — | Cu coating | 0.5 | Bright Sn coating | 1 | 2 | 0.90 | 0.18 | 0.00 | 0.00 | 0.00 | 0.20 |
| Comparison 6 | — | — | Cu coating | 0.5 | Sn coating → Reflow treatment | 1 | 2 | 0.65 | 0.48 | 0.29 | 0.08 | 0.00 | 0.38 |
| Comparison 7 | — | — | Cu coating | 0.5 | Bright Sn—Bi coating | 1.5 | 3 | 1.38 | 0.00 | 0.00 | 0.00 | 0.00 | 0.21 |
| Comparison 8 | Ni coating | 0.5 | — | — | Bright Sn—Cu coating | 1.5 | — | 1.45 | 0.00 | 0.00 | 0.00 | 0.00 | 0.24 |
| Comparison 9 | Ni coating | 0.5 | — | — | Bright Sn—Pb coating | 1.5 | — | 1.44 | 0.00 | 0.00 | 0.00 | 0.00 | 0.25 |

The following is clear from Tables 2 and 3:

(1) When the embodiments and the comparison examples are compared, it is found that in the embodiments, generally, the top-coating (Sn) remains even when the environment temperature becomes high, and that the apparent coefficient of dynamic friction is small. Further, an embodiment having a top-coating formed with a larger thickness has a remaining top-coating (Sn) of a larger thickness after heating, therefore maintains heat-resistance, better. On the other hand, however, an embodiment having a top-coating of a smaller thickness has a smaller coefficient of dynamic friction. For this reason, an embodiment having a top-coating of a smaller thickness is advantageous in insertability/extractability.

(2) The similar effects are produced even in the case where the undercoating is not an Ni coating as in embodiments 7~10, if the undercoating is of a kind that prevents diffusion of a component of the substrate alloy (component of a substrate alloy such as Cu or Zn) toward the top-coating. Further, the similar effects are produced even in the case where the intermediate coating is made of Cu and the undercoating is not an Ni coating as in embodiments 7~10, if the rate of reaction between the intermediate coating and the undercoating is higher than the rate of reaction between the intermediate coating and the top-coating.

In the case where the thickness of the intermediate coating is small as in embodiment 13, the diffusion between the undercoating and the top-coating is restrained less. As is clear from comparison between embodiments 14 and 15, when the top-coating has a larger thickness, the heat-resistance is higher, and when the top-coating has a smaller thickness, the apparent coefficient of dynamic friction is smaller, therefore the insertability/extractability is better.

Embodiments 25~33 of terminal pair according to the present invention, Comparison Examples 10~25

Male and female terminals of 2.3 mm in tab width were made using samples of embodiments 3, 5, 9 and 12 and comparison examples 5 and 6.

The male and female terminals were paired as shown in Table 4, and the paired male and female terminals were fitted together. Then, heat treatment was performed on the male and female terminals fitted together, at a temperature of 160° C. for 120 hours. Then, contact resistance between the male and female terminals was measured.

It is to be noted that when the male and female terminals were fitted together, insertion was performed at a rate of 2 mm/sec, and the peak force required during the insertion was measured as force for insertion. The force for insertion shown in table 4 is an average that was obtained from five samples.

Contact resistance was measured by joining the terminals with lead and making a current flow through them at 10 mA. The contact resistance shown in table 4 is an average that was obtained from ten samples.

whereas the male terminal comes in contact with the female terminal linearly and therefore it is scraped linearly.

Thus, in order to reduce the force for insertion, it is thought to be effective to reduce the thickness of the top-coating Sn) of the male terminal.

The reason that the contact resistance after heat treatment is smaller in the embodiments is thought to be that in the terminal pairs according to the present invention, the top-coating (Sn) remains even after heat treatment, which improves reliability of contact. In contrast, in the comparison examples, the top-coating (Sn) disappears due to heat treatment, which increases the contact resistance.

Industrial Applicability

As is clear from the above description, in the plated material according to the present invention, an intermediate coating of Cu or Cu alloy exists between an undercoating and a top-coating, and the thickness of the top-coating and the thickness of the intermediate coating are designed so that the top-coating of Sn or Sn alloy may remain even in a high temperature environment.

TABLE 4

|  | Material used for male terminal | Material used for female terminal | Results | |
|---|---|---|---|---|
|  |  |  | Force for insertion (N) | Contact resistance (mΩ) |
| Embodiment 25 | Embodiment 3 | Embodiment 3 | 5.3 | 1 |
| Embodiment 26 | Embodiment 3 | Embodiment 5 | 5.5 | 0.9 |
| Embodiment 27 | Embodiment 3 | Embodiment 12 | 5.6 | 0.9 |
| Comparison 10 | Embodiment 3 | Comparison 5 | 5.8 | 3.5 |
| Comparison 11 | Embodiment 3 | Comparison 6 | 6.2 | 2.3 |
| Embodiment 28 | Embodiment 5 | Embodiment 3 | 5.9 | 0.9 |
| Embodiment 29 | Embodiment 5 | Embodiment 5 | 6.0 | 0.6 |
| Embodiment 30 | Embodiment 5 | Embodiment 12 | 6.2 | 0.6 |
| Comparison 12 | Embodiment 5 | Comparison 5 | 6.3 | 4.2 |
| Comparison 13 | Embodiment 5 | Comparison 6 | 6.6 | 3.7 |
| Embodiment 31 | Embodiment 12 | Embodiment 3 | 6.2 | 1 |
| Embodiment 32 | Embodiment 12 | Embodiment 5 | 6.3 | 0.5 |
| Embodiment 33 | Embodiment 12 | Embodiment 12 | 6.5 | 0.6 |
| Comparison 14 | Embodiment 12 | Comparison 5 | 7.4 | 3.2 |
| Comparison 15 | Embodiment 12 | Comparison 6 | 6.9 | 2.9 |
| Comparison 16 | Comparison 5 | Embodiment 3 | 6.5 | 8.4 |
| Comparison 17 | Comparison 5 | Embodiment 5 | 6.7 | 5.3 |
| Comparison 18 | Comparison 5 | Embodiment 12 | 6.8 | 5.1 |
| Comparison 19 | Comparison 5 | Comparison 5 | 6.9 | >10 |
| Comparison 20 | Comparison 5 | Comparison 6 | 7.2 | >10 |
| Comparison 21 | Comparison 6 | Embodiment 3 | 7.1 | 7.4 |
| Comparison 22 | Comparison 6 | Embodiment 5 | 7.1 | 4.2 |
| Comparison 23 | Comparison 6 | Embodiment 12 | 7.3 | 3.5 |
| Comparison 24 | Comparison 6 | Comparison 5 | 7.3 | >10 |
| Comparison 25 | Comparison 6 | Comparison 6 | 7.6 | >10 |

The following is clear from Table 4:

(1) When the embodiments of terminal pair according to the present invention and the comparison examples are compared, it is found that in the embodiments, generally, force for insertion at the time of fitting is smaller, and contact resistance after heat treatment is smaller.

In the embodiments of terminal pair, force for insertion at the time of fitting is generally small, specifically 5.3~6.5 N. In the comparison examples of terminal pair, force for insertion is smaller in the case where a male terminal is made using any of the embodiments of plated material than in the case where a female terminal is made using any of the embodiments of plated material. The reason is thought to be that when a male and a female terminals are fitted together, the female terminal comes in contact with the male terminal only at a point and therefore it is scraped only at one point, Therefore, the plated material has high heat-resistance, or both high heat-resistance and good insertability/extractability, and therefore it is useful as a material for various electrical/electronic parts such as connectors, fitting-type connectors, contactors, etc. placed in a high temperature environment, for example, in an engine room of an automobile.

What is claimed is:

1. A fitting connector with good insertability/extractability, said fitting connector being made of a material comprising an undercoating of any one of metals belonging to group 4, group 5, group 6, group 7, group 8, group 9 or group 10 of the periodic table, an intermediate coating of Cu or a Cu alloy, and a top-coating of Sn or an Sn alloy, said undercoating, said intermediate coating and said top-coating being formed on a surface of an electrically conductive base in this order, wherein the thickness of said top-coating is 1.0 times or more than the thickness of said intermediate coating, wherein the Sn alloy contains at least one metal selected from the group consisting of Bi, Ci, and Sb.

2. The fitting connector with good insertability/extractability according to claim 1, wherein said undercoating is made of any one of metals Ni, Co and Fe, or an alloy containing any one of said metals as a main component.

3. The fitting connector with good insertability/extractability according to claim 1, wherein thickness of said undercoating is 0.05 to 2 μm and the thickness of said intermediate coating is 0.01 to 1 μm.

4. The fitting connector with good insertability/extractability according to claim 1, wherein the thickness of said intermediate coating is 0.05 to 0.49 μm, and the thickness of said top-coating is 1 μm or less.

5. The fitting connector with good insertability/extractability according to claim 1, wherein said top-coating is a coating on which reflow treatment has been performed.

6. The fitting connector with good insertability/extractability according to claim 1, wherein said electrically conductive base is made of Cu or a Cu alloy.

7. A method of producing a material for a fitting connector with good insertability/extractability wherein on a surface of an electrically conductive base, an undercoating of any one of metals belonging to group 4, group 5, group 6, group 7, group 8, group 9 or group 10 of the periodic table, an intermediate coating of Cu or a Cu alloy, and a top-coating of an Sn alloy are formed in this order, wherein the Sn alloy contains at least one metal selected from the group consisting of Bi, Cu, and Sb.

8. The method of producing a material for a fitting connector with good insertability/extractability according to claim 7, further comprising performing reflow treatment or thermal diffusion treatment on the top coating.

* * * * *